United States Patent [19]

Ornee

[11] 4,215,286
[45] Jul. 29, 1980

[54] VARIABLE RELUCTANCE ELECTROMAGNETIC PICKUP

[75] Inventor: Michael W. Ornee, Goleta, Calif.

[73] Assignee: General Motors Corporation, Detroit, Mich.

[21] Appl. No.: 959,989

[22] Filed: Nov. 13, 1978

[51] Int. Cl.² ........................................ H02K 21/38
[52] U.S. Cl. ................................ 310/155; 310/168
[58] Field of Search .................. 310/155, 168, 151; 329/170, 171

[56] References Cited

U.S. PATENT DOCUMENTS

| 1,024,418 | 4/1912 | Podlesak | 310/155 |
|---|---|---|---|
| 2,304,866 | 12/1942 | Wall | 310/155 |
| 2,508,524 | 5/1950 | Lang | 310/155 |
| 3,041,483 | 6/1962 | Ebbinghaw et al. | 310/15 |
| 3,133,214 | 5/1964 | Lawson et al. | 310/15 |
| 3,492,518 | 1/1970 | Wayne | 310/155 |
| 3,604,965 | 9/1971 | Stroud | 310/155 |
| 3,619,678 | 11/1971 | Ruo | 310/155 |
| 3,942,045 | 3/1976 | Palazetti | 310/155 |

*Primary Examiner*—Donovan F. Duggan
*Attorney, Agent, or Firm*—Warren D. Hill

[57] ABSTRACT

A variable reluctance pickup for producing electrical pulses in response to the rotation of an adjacent toothed wheel comprises a probe assembly situated tangentially to the path of the wheel teeth. The sensor comprises an elongated core surrounded by a coil and having permanent magnets of opposed polarity at each end of the core. A pole piece extending laterally from one end of the core extends to a point adjacent the path of the teeth of the rotating part. The electrical pulses produced upon part rotation are double the size of pulses produced in the case where only one magnet of equivalent strength to the two magnets is used.

2 Claims, 2 Drawing Figures

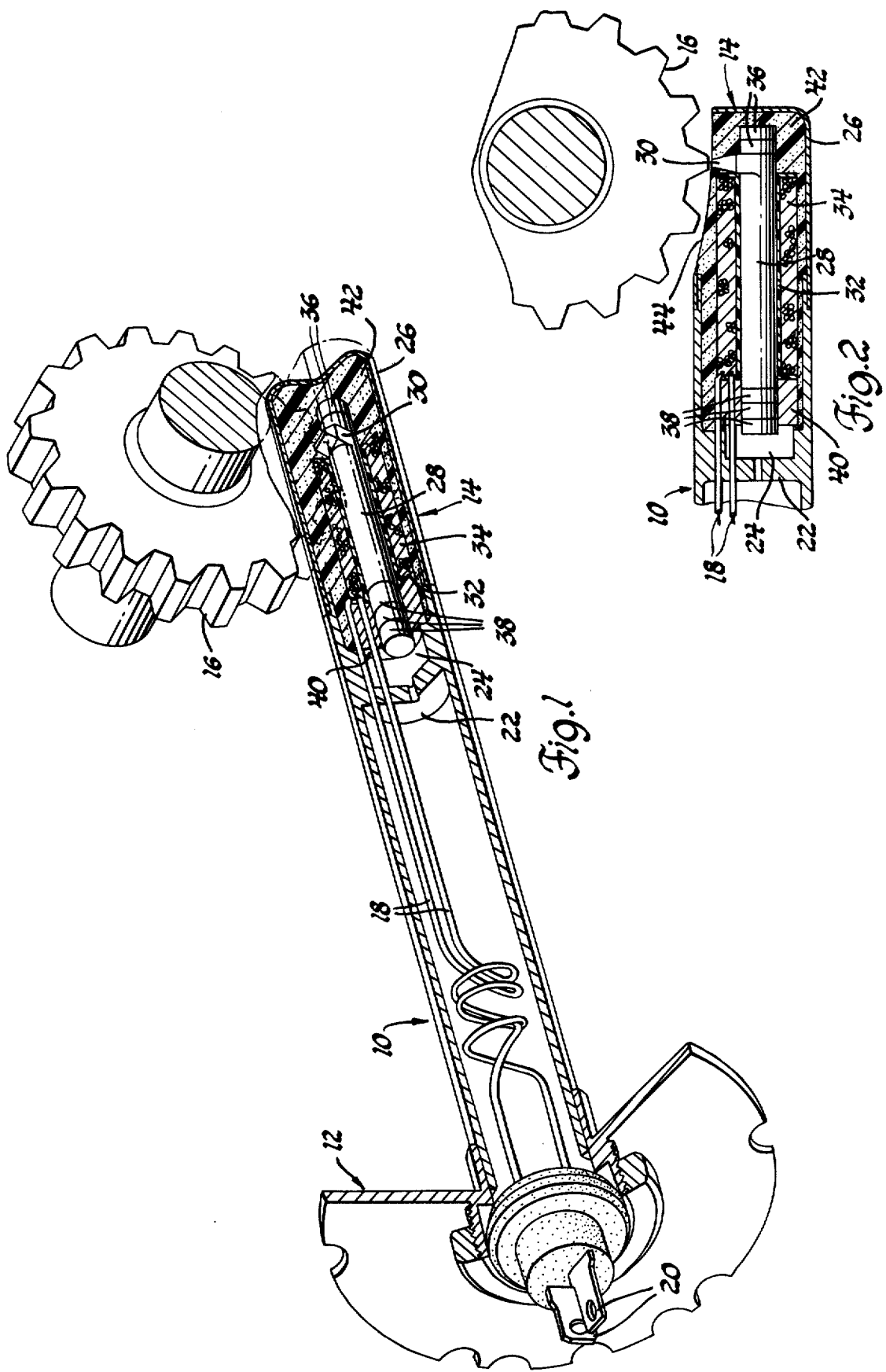

VARIABLE RELUCTANCE ELECTROMAGNETIC PICKUP

This invention relates to a variable reluctance electromagnetic pickup for sensing the rotation of a toothed wheel.

It is well known to use a variable reluctance electromagnetic pickup to sense tooth wheel rotation. The common practice is to provide a permanent magnet having one pole in magnetic circuit with a pole piece which extends to a position adjacent the path of a rotating toothed part such that movement of the teeth past the pole piece varies the reluctance of the magnetic path thereby varying the flux flowing through the pole piece. A coil around the pole piece generates electrical pulses upon variation in the flux. For economic and space limitation reasons, it is desirable to use a minimum amount of magnet material and yet produce an electrical signal which is strong enough to provide a good signal to noise ratio and which is easily detectable. During the development of a pickup which utilized a pole piece extending 90° from the core, it was discovered that a unique placement of magnet material provides electrical output signals of more than double the amplitude of signals obtained with a conventional magnet placement.

It is, therefore, a general object of the invention to provide a variable reluctance electromagnetic pickup of unique structure which provides increased electrical signal amplitude for a given amount of magnet material.

The invention is carried out by providing in a variable reluctance pickup a core terminating at one end in a pole piece extending therefrom, a coil surrounding the core, and magnets at both ends of the core placed in magnetic opposition.

The above and other advantages will be made more apparent from the following specification taken in conjunction with the accompanying drawings wherein like reference numerals refer to like parts and wherein:

FIG. 1 is a partially broken away perspective view of a probe containing a variable reluctance electromagnetic pickup according to the invention, and FIG. 2 is a longitudinal sectional view of the electromagnetic pickup of FIG. 1.

As shown in the drawings, a long slender cylindrical probe 10 has at one end an annular adapter plate 12 secured thereto and at the other end a pickup assembly 14 is mounted within the probe. The probe is aligned tangentially to a gear 16 situated near the pickup assembly 14. The probe configuration is suitable for mounting in a transmission wherein the adapter plate 12 is secured to the transmission housing and the gear 16 is a transmission gear. Lead wires 18 extend from the pickup assemby 14 to electrical terminals 20 mounted on the outside end of the probe 10. The body of the probe comprises a thin walled tubular steel section adjacent the adapter plate 12 separated by a web 22 from a cavity section 24 which cavity contains the pickup assembly. A generally cylindrical aluminum cap 26 joins the steel housing to provide a nonmagnetic end portion for the housing.

The pickup assembly 14 in the cavity of the probe 10 includes an elongated cylindrical ferrite core 28 having at one end a pole piece 30 extending laterally at 90° from the axis of the core. The pole piece 30 is of single tooth form and is integral with the core 28. The pole piece 30 extends to a point very close to the path of the teeth of the gear 16. A plastic bobbin 32 on the core 28 carries a coil 34. Two cylindrical magnets 36 are bonded to the end of the core adjacent the tooth 30 while three similar magnets 38 are bonded to the opposite end of the core 28. The magnets 38 extend into a cavity of the steel probe housing and are radially separated from the wall thereof by an aluminum annular spacer 40. The outermost of the magnets 38 is separated from the web 22 of the steel housing by an air gap. The three magnets 38 are each positioned with their north poles facing inward toward the core 28 and their south poles facing outward. Similarly, the two magnets 36 have their north poles facing inward toward the core 28 and their south poles facing outward so that magnetic fields from the two sets of magnets are potentially opposed. Of course, the magnet polarity could be reversed. An epoxy potting material 42 fills the space between the pickup assembly and the steel and aluminum housing. A scoop-like indentation 44 is machined into one side of the aluminum cap and potting material to expose the tip of the tooth 30 and allow the pole piece to be assembled close to the path of the gear 16.

As a specific example of a pickup assembly, the core is made of ferrite and is approximately 1.6 inches long and 0.25 inch in diameter. The pole piece extends 0.2 inch beyond the periphery of the cylindrical core and has a width of 0.38 inches at its outer face. The coil comprises 8,000 turns of magnet wire No. 38AWG wound on the bobbin and each of the five magnets comprised of samarium cobalt 12 fully magnetized and having a diameter of 0.25 inch and a thickness of 0.1 inch. The pole piece is spaced from the path of the teeth of the gear 16 by 0.03 inch. For a gear of 64 teeth and 2 inches in diameter rotating at a minimum speed of 88 rpm a minimum output of 200 millivolts peak-to-peak is obtained.

In typical prior art pickup assemblies, the magnet is concentrated in one location at the rear of the core like the magnet 38 of the present configuration. Applicant has found, however, that with the magnets 36 and 38 located as described herein, the output voltage pulses are at least double in magnitude as compared to the case where the same magnets were all positioned at the rear of the core 28. The reason for the improved operation is believed to be as follows. The magnets 38, if used alone, would produce a high flux value through the core when a gear tooth is aligned with the pole piece 30 and a low but significant value when the pole piece is not aligned with a tooth. The addition of the magnets 36 would have no appreciably affect on the flux in the core when the pole piece is aligned with a tooth since the flux of the magnets 36 will primarily flow through the pole piece and the gear and return to the outer face of the magnets 36. Only minor stray fields would enter the body of the core 28 within the coil. When, however, the pole piece is not aligned with a gear tooth, the flux from the magnets 36 enters the core 28 to buck the low value flux in the core from magnet 38 making the net value of the flux much less than it would be otherwise. Then the range of flux variation in the core 28 due to gear rotation is much larger. Accordingly, for a given gear speed, the rate of change of flux will be larger to induce a greater emf in the coil.

The embodiments of the invention in which an exclusive property or privilege is claimed are defined as follows:

1. A variable reluctance pulse generator for sensing the rotation of a rotary member comprising a toothed member of magnetic material driven by the said rotary member, an elongated core member of magnetic material having first and second ends, a coil around the core member between the ends, a pole piece of magnetic material extending from the first end of the core member and positioned close to the toothed member and periodically aligned with the teeth thereof during rotation, a first magnet adjacent the second end of the core member to provide a magnetic flux through the core member, the pole piece and the toothed member, the said flux varying between a high value and a low value as the teeth of the toothed member are aligned and nonaligned, respectively, with the pole piece, whereby an emf is induced in the coil as the flux varies, and a second magnet adjacent the first end of the core member arranged in opposition to the first magnet for bucking the low value flux in the core when the pole piece is nonaligned with the teeth of the toothed member to effectively reduce the low value flux from the first magnet whereby the flux variation is increased and the induced emf is increased.

2. A variable reluctance pulse generator for sensing the rotation of a rotary member comprising a toothed member of magnetic material driven by the said rotary member, an elongated core member of magnetic material having a central axis and first and second ends, a coil around the core member between the ends, a pole piece of magnetic material extending laterally from the first end of the core member and positioned close to the toothed member and periodically aligned with the teeth thereof during rotation, a first magnet adjacent the second end of the core member and aligned with the axis of the core member to provide a magnetic flux through the core member, the pole piece and the toothed member, the said flux varying between a high value and a low value as the teeth of the toothed member are aligned and nonaligned, respectively, with the pole piece, whereby an emf is induced in the coil as the flux varies, and a second magnet adjacent the first end of the core member and aligned with the axis of the core member and arranged in opposition to the first magnet for bucking the low value flux in the core when the pole piece is nonaligned with the teeth of the toothed member to effectively reduce the low value flux from the first magnet whereby the flux variation is increased and the induced emf is increased.

* * * * *